(No Model.)
K. M. MITCHELL.
DEHYDRATOR.
No. 453,125. Patented May 26, 1891.
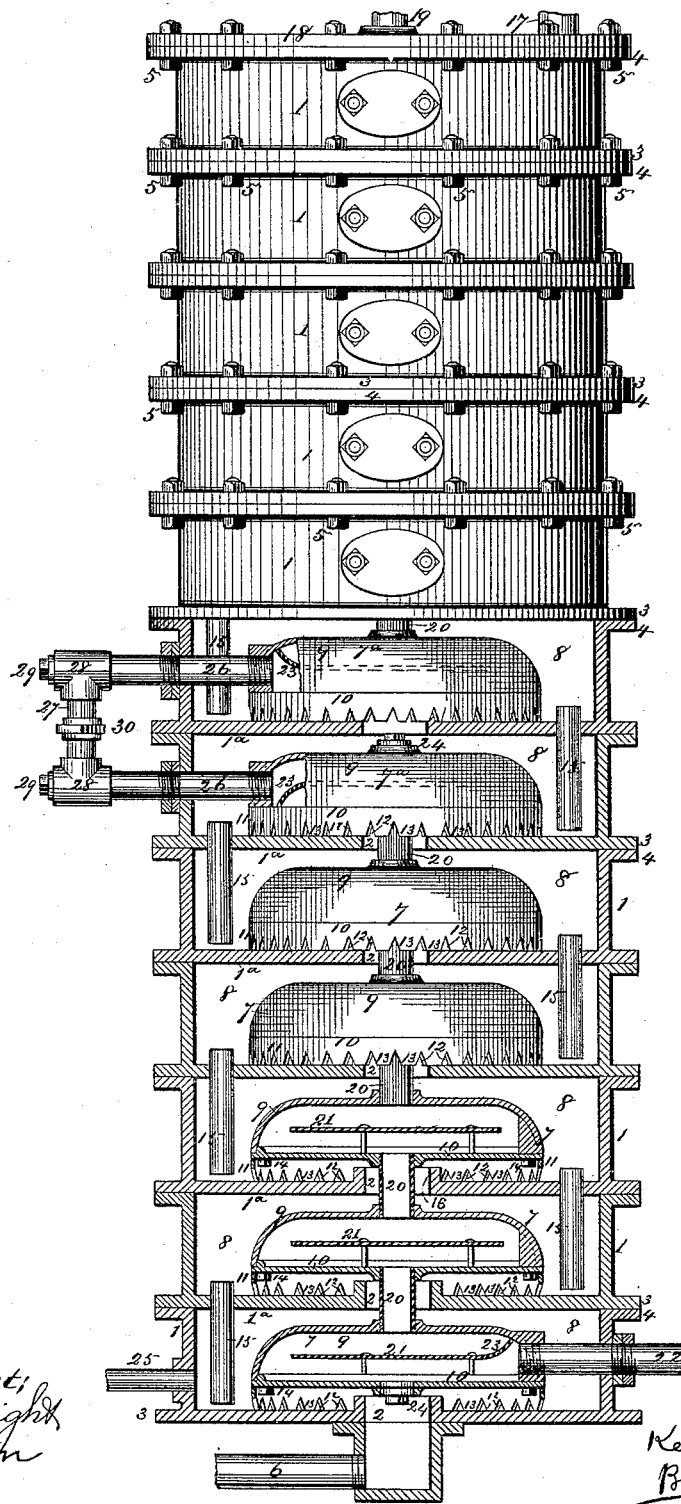
Attest:
S. H. Knight
S. Cotton
Inventor:
Kerr M. Mitchell
By Knight Bros
Attys.

UNITED STATES PATENT OFFICE.

KERR M. MITCHELL, OF ST. JOSEPH, ASSIGNOR OF ONE-HALF TO ROBERT P. GREER, OF ST. LOUIS, MISSOURI.

DEHYDRATER.

SPECIFICATION forming part of Letters Patent No. 453,125, dated May 26, 1891.

Application filed November 21, 1890. Serial No. 372,194. (No model.)

*To all whom it may concern:*

Be it known that I, KERR M. MITCHELL, of St. Joseph, in the county of Buchanan and State of Missouri, have invented a certain new and useful Improvement in Condensers, of which the following is a full, clear, and exact description, reference being had to the accompanying drawings, forming part of this specification.

This is a machine intended, primarily, for the condensation of aqueous vapor in ammonia-gas.

The novel parts will be set forth in the claims.

The drawing shows the machine part in elevation and part in axial section.

The body or case of the apparatus consists of a number of substantially similar cylindrical sections 1, of cast-iron or other metal made with flanges, by which they may be bolted together with a gas-tight joint, and having a bottom 1$^a$ with a central aperture 2, by which the interiors of the sections communicate together. The flanges are shown at 3 and 4 and the bolts at 5.

6 is the gas-supply pipe, which communicates with the aperture 2 of the lower section.

7 is a water-vessel, of which there is one within the chamber 8 of each section. The said water-vessel may consist of two pieces, as shown, or may have any other suitable construction. As shown, it has a bell-formed upper member 9 and a flat bottom member 10, with a descending flange 11 at its margin. The flange 11 has a number of notches forming apertures 12, with intermediate feet 13, which rest upon the bottom 1 of the cast section. The parts 9 and 10 are shown to be connected by screws 14.

15 are overflow-pipes extending through the bottom 10 of each section, so as to form a communication between one chamber 8 and another. The upper end of the overflow-pipe is above the level of the top of the apertures 12, so that the water within the chamber 8 seals the apertures and prevents the escape of gas through the apertures without passing through the water.

16 is a standing flange around the aperture 2 to prevent the escape of water through the aperture. The lower ends of the overflow-pipes extend down below the surface of the water to prevent the ascent of gas through said pipes. The gas after passing through all the sections escapes through a pipe 17, passing through the top plate 18, by which the top section is closed.

19 is a cold-water-supply pipe by which water is supplied to the vessels 7. The pipes 19 discharges into the top of the upper vessel 7. (Not shown.)

20 are pipes extending through the bottom of each vessel 7 (except the lower one) and through the top of the vessel next below it, thus forming a connection between the interiors of the vessels.

21 is a deflecting-plate extending horizontally in the vessel, and of such size as to leave an annular space between the margin of the plate and the side of the vessel, so that the water from the pipe above will flow outward over the plate 21 and inward beneath the plate to the pipe 20 below, cooling the whole of the vessel. The water from the vessels finally escapes through a pipe 22, the bottom orifice of the chamber being closed by a screw-plug 24. The deflecting-plate 21 in this case is preferably made to have contact with the vessel at the discharge side above the pipe 22, as seen at 2, so as to force the water to flow around the opposite edge of the deflector in its passage from pipe 20 to pipe 22. The overflow water from the chambers 8 finally escapes through a pipe 25. I prefer to make the connection between the ends of the pipes 20 and the vessels 7 by screwing the pipes into the vessels, so that without some special provision the sections cannot be separated, except by removing one at a time, thus giving access to each of the vessels 7 in turn, allowing the screw connection between it and the pipe 20 to be unscrewed. To meet this difficulty, one of the pipes 20 is dispensed with, and the openings through the bottom and top of the contiguous vessels 7$^a$, from which the pipe 20 is removed, closed by screw-plugs 24. The communication between the vessels 7$^a$ is made by pipes 26, screwing into the sides of the vessels and passing with a tight joint through the sides of the sections 1, being connected by a vertical pipe 27 and Ts 28.

29 are screw-plugs by which the outer ends of the Ts are closed. The pipe 27 has a union coupling 30. The deflectors 22 in this case are made at 23 to touch the sides of the vessels with which the pipes 26 communicate, the edge 23 in the upper vessel 7ᵃ being turned up above the pipe-opening, and in the lower vessel 7ᵃ turned down below the pipe-opening, so that in each case the water has to pass from the side of the vessel before it escapes therefrom.

The operation of the device is as follows: The chambers 8 are supposed to contain water, whose surface is even with the tops of the overflow-pipes 15, so that the apertures 12 are covered with the water. The ammonia-gas is forced through the pipe 6 and aperture 2 into the chamber beneath the cold-water vessel 7, and coming in contact with the bottom plate of the cold-water vessel is cooled thereby and vapor condensed. The gas then escapes through the apertures 12, passing through the water and parts with more of its vapor by condensation. In the chamber 8 the gas is further cooled by the sides of the sections 1 and of the cold-water vessel 7, and the condensation continues. The sides of the sections 1 are cooled by the surrounding air. As the vapor is condensed it adds to the water in the bottom of chambers 8, the surplus finding exit through the overflow-pipes and escaping from the machine through pipe 25. A current of cold water is passing through the vessels 7 and escaping through the pipe 22. The anhydrous gas passes from the machine through the pipe 17.

I claim as my invention—

1. A condenser having a chamber 8, containing a vessel 7, adapted for the passage of water, and having an annular flange 11 resting on the bottom 1ᵃ of the section, with notches forming apertures 12, an overflow-pipe from the chamber 8, and induction and eduction openings 2 for the passage of gas, substantially as and for the purpose set forth.

2. A condenser having a chamber 8, with induction and eduction openings 2, and containing a water-vessel 7 with induction and eduction passages 20 and deflector 21, and having an annular flange 11 resting on the bottom 1ᵃ of the section, said flange provided with notches forming apertures 12, and an overflow-pipe 15 from the chamber 8 of one section to the chamber 8 of the section beneath, substantially as set forth.

3. A condenser having two or more sections 1 in vertical column, with induction and eduction gas-openings 2 and overflow-pipes 15, and a water-vessel inclosed within each section, having induction and eduction water-passages, and an annular descending flange resting on the bottom 1ᵃ of the section and with apertures 12 for the passage of gas, all constructed to operate substantially as and for the purpose set forth.

4. The combination of the condenser formed of a number of sections 1 in vertical column, each section containing a water-vessel 7 and the connection between the water-vessels of the adjacent sections, consisting of the pipes 26, extending and coupled together outside the sections 1, substantially as set forth.

KERR M. MITCHELL.

Witnesses:
 EDGAR SLEPPY,
 JOHN H. FITZGERALD.